United States Patent
Griep et al.

(10) Patent No.: US 9,396,289 B2
(45) Date of Patent: Jul. 19, 2016

(54) METHOD AND APPARATUS FOR UNRESTRICTED REPORTING OF ALERT STATES FOR MANAGED OBJECTS, REGARDLESS OF TYPE

(75) Inventors: Charles Griep, St. Anthony, MN (US); David E. Wilhelm, Woodbury, MN (US); Brian Wegleitner, Andover, MN (US)

(73) Assignee: Unisys Corporation, Blue Bell, PA (US)

( * ) Notice: Subject to any disclaimer, the term of this patent is extended or adjusted under 35 U.S.C. 154(b) by 680 days.

(21) Appl. No.: 12/568,991

(22) Filed: Sep. 29, 2009

(65) Prior Publication Data

US 2011/0078207 A1 Mar. 31, 2011

(51) Int. Cl.
*G06F 17/30* (2006.01)

(52) U.S. Cl.
CPC .............................. *G06F 17/30994* (2013.01)

(58) Field of Classification Search
USPC ................................... 707/802; 717/105, 109
See application file for complete search history.

(56) References Cited

U.S. PATENT DOCUMENTS

| | | | |
|---|---|---|---|
| 6,421,821 B1* | 7/2002 | Lavallee | 717/109 |
| 6,557,023 B1* | 4/2003 | Taivalsaari | 718/1 |
| 6,839,747 B1* | 1/2005 | Blumenau et al. | 709/223 |
| 8,099,681 B2* | 1/2012 | Flanagan et al. | 715/853 |
| 2003/0056024 A1* | 3/2003 | Tlaskal et al. | 709/315 |
| 2003/0101261 A1* | 5/2003 | Ikeda et al. | 709/224 |
| 2006/0206860 A1* | 9/2006 | Dardinski et al. | 717/105 |
| 2007/0186169 A1* | 8/2007 | Osborne et al. | 715/734 |
| 2007/0240052 A1* | 10/2007 | Sherrill et al. | 715/700 |
| 2008/0016474 A1* | 1/2008 | Guido et al. | 715/854 |
| 2008/0126403 A1* | 5/2008 | Moon | 707/103 R |
| 2008/0216094 A1* | 9/2008 | Anderson et al. | 719/318 |
| 2011/0276396 A1* | 11/2011 | Rathod | 705/14.49 |
| 2012/0054682 A1* | 3/2012 | Bell et al. | 715/817 |

* cited by examiner

*Primary Examiner* — Sherief Badawi
*Assistant Examiner* — Christopher J Raab
(74) *Attorney, Agent, or Firm* — Richard J. Gregson

(57) ABSTRACT

A method of identifying a unique object nested within a hierarchy of objects in a computing system. The computing system identifies the unique object by its class and instance in a syntax readable by the computing system. The method identifies at least one parent object by its class and instance in the syntax and defines a relationship between the unique object and the parent object in the syntax. An computing system is used for identifying a unique object nested within a hierarchy of objects in the computing system. The computing system includes a first identify module, a second identify module, and a define module, The first identify module identifies the unique object by its class. The second identify module identifies at least one parent object by its class and instance in the syntax. And, the define module that defines a relationship between the unique object and the parent object in the syntax. An alert can be issued for the unique object.

12 Claims, 6 Drawing Sheets

METHOD AND APPARATUS FOR UNRESTRICTED REPORTING OF ALERT STATES FOR MANAGED OBJECTS, REGARDLESS OF TYPE

RELATED APPLICATIONS

The following commonly-assigned patent applications have at least some subject matter in common with the current application, all of which were filed on same date herewith:

Ser. No. "*" 12/568,704 entitled "Method and Apparatus for Reporting an Alert State at Any Level of a Hierarchy of Objects";

Ser. No. "*" 12/568,705 entitled "Method and Apparatus for Displaying Multiple States Within a Single Image"; and Ser. No. "*" 12/568,706 entitled "Method and Apparatus for Displaying a Monitored State with No Explicit Connection".

TECHNICAL FIELD

The present disclosure relates to managing classes in object-oriented programming. In particular, the present disclosure relates to managing objects in mainframes or large distributed computing systems.

BACKGROUND

Information technology systems are essential to any modern business. These systems have grown more and more complex. Today they can include distributed centers located anywhere from a few miles apart to those across the continent or in separate countries. Today, personal computers are common and many businesses employ multiple operating systems from various vendors. Often systems are dispersed in branch offices running critical applications or containing essential data.

Tools are available that integrate operational control of multiple heterogeneous mainframes and distributed systems. These systems include numerous components that need to be managed. Typically, managed classes are used to view, monitor, and manage these components. The managed classes are typically predefined in operational software for managing the components of the system. In prior systems and consoles are monitored in a separate application from system components (applications, hardware device, etc.). The systems and consoles are organized into cluster diagrams with one top level cluster. System components are monitored separately in a similar arrangement by component type or system with tables displaying the status information. This is disadvantageous because it results in many different windows being displayed on the user's screen, and not all information can be viewed in one window. This is particularly cumbersome as the system grows larger and larger.

Another disadvantage is that the classes or objects can be nested deeply within an ownership tree of objects. Identifying an alert for a deeply nested object can be difficult. In addition. The name of the object may be the same for another object within the same ownership tree or a different ownership tree. Another disadvantage is that multiple topography diagrams are need to view state information for all objects.

For these and other reasons, improvements are desirable.

SUMMARY

In accordance with the following disclosure, the above and other problems are solved by the following:

In a first aspect, a method of identifying a unique object nested within a hierarchy of objects in a computing system is disclosed. The method includes identifying the unique object by its class and instance in a syntax readable by the computing system; identifying at least one parent object by its class and instance in the syntax; and defining a relationship between the unique object and the parent object in the syntax; wherein an alert can be issued for the unique object.

In a second aspect, an apparatus for identifying a unique object nested within a hierarchy of objects in a computing system is disclosed. The apparatus includes a first identify module, a second identify module, and a define module. The first identify module identifies the unique object by its class and instance in a syntax readable by the computing system. The second identify module identifies at least one parent object by its class and instance in the syntax. And, the define module that defines a relationship between the unique object and the parent object in the syntax. An alert can be issued for the unique object.

DETAILED DESCRIPTION

Figure 1:
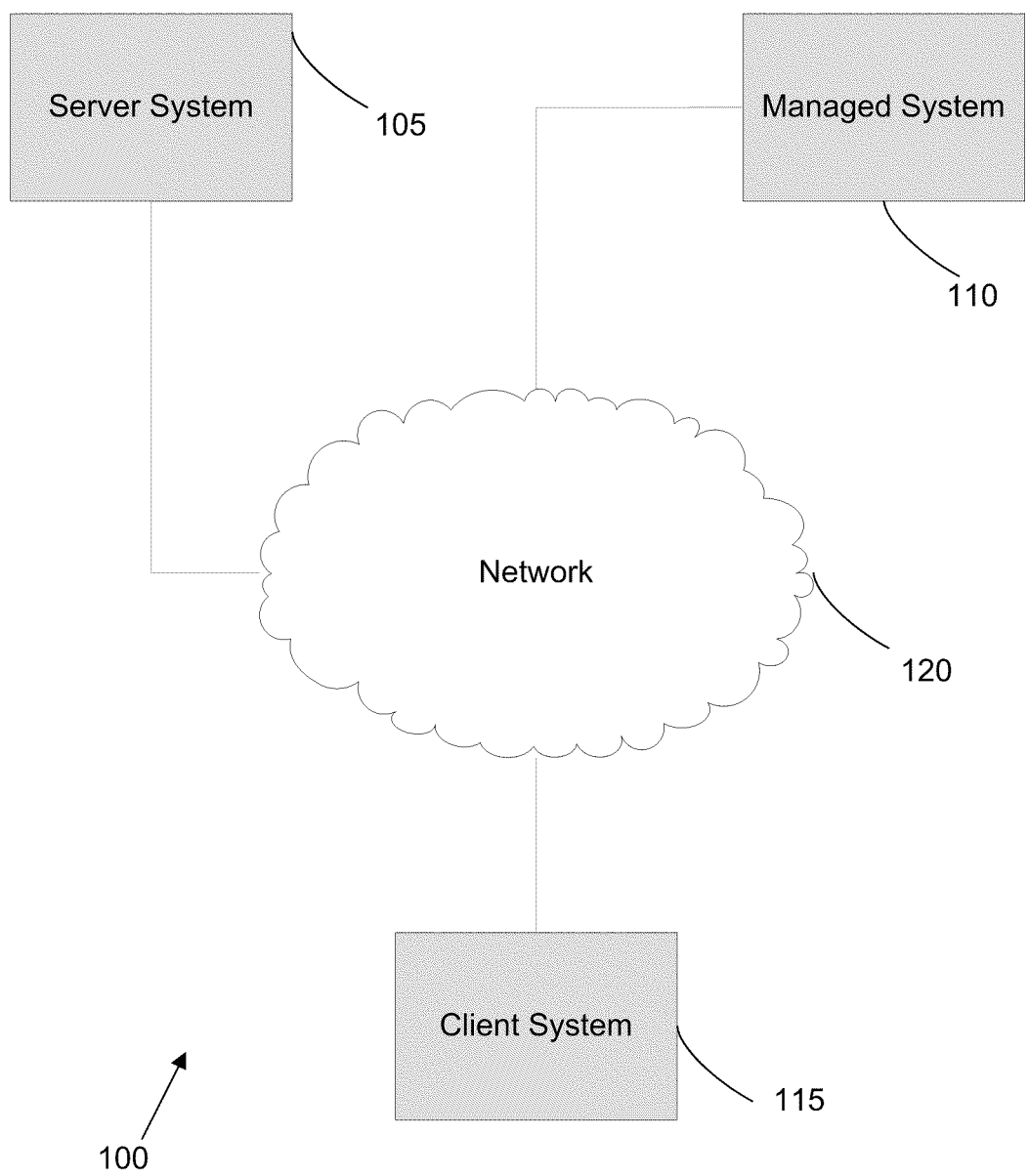
FIG. 1 is a block diagram of an operational system for managing a large computing distributed computing system.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

Object-oriented programming uses primarily classes and objects. A class creates a new type where objects are instances of the class. Objects can store data using ordinary variables that belong to the object. Variables that belong to an object or class are called fields. Objects can also have functionality by using functions that belong to a class. Such functions are called methods of the class. Collectively, the fields and methods can be referred to as the attributes of that class. Fields can belong to each object of the class or they can belong to the class itself.

Classes are created in the source code itself by using the class statement followed by the name of the class. An object of the class can then be created. Class variables are shared by all objects of that class. There is only one copy of the class variable, and when an object makes a change to a class variable, the change is reflected in all other objects as well. Object variables are owned by each object and are not shared. Sub-classes can also be used that inherit the properties of the parent class, but can also have additional defined properties.

In general, the present disclosure relates to the capability for users to manage systems and components of computing systems such as disks, tapes, users, and processes by managing classes within an operational system. One class may relate to disk drives in the computing system, while one object relates to a particular disk drive. Many classes are typically predefined in the operational system. The present disclosure relates to managing objects arranged in a hierarchy, using sub-views, created by the user. Each view has an alert state that represents the highest alert state of all managed objects and sub-views of said view. Clicking on the sub-view icon will drill-down and bring up the sub-view display allowing the user to navigate directly to the managed object or objects responsible for the alert state. In this setup, the top level view displays all the necessary information for the user to monitor the alert state of all managed objects within said view and any sub-views (recursively).

Referring to FIG. 1, FIG. 1 is a block diagram of an operational system for managing a large computing distributed computing system 100. The system 100 includes a server system 105, a managed system 110, and a client system 115, as is well known in the art. The server system 105, managed system 110, and the client system 115 preferably communicate with one another over a network 120, which can be any suitable network such as a LAN, WAN, or any other network.

In one possible embodiment, the server system 105 acts as a maintenance processing system and/or a utility monitoring processing system that functions to monitor the activities and health of the components, processes, and tasks executing within the managed system 110. The managed system 110 performs the processing desired by the operators of the managed system 110. Client system 115 are processing systems utilized by operators of the managed system 110 to view operations, maintenance and health information regarding the components, processes and tasks in the managed system 110. In the embodiment shown in FIG. 1, these three systems are shown to be separate processing systems. One of ordinary skill in the art will recognize that these systems may be implemented to operate on one as well as numerous hardware systems without deviating from the spirit and scope of the present invention as recited within the attached claims.

In one example embodiment, Operations Sentinel® by Unisys® provides an operational environment for managing large computing systems. Operations Sentinel® includes pre-defined classes for managing objects in the computing system. These can include an Arbitrary system, MCP system, OS 2200 Console, OS 2200 System, Server, UNIX/Linux System, Windows System and Component.

A user can manage objects by arranging them in a hierarchy and create views and sub-views for all objects the user wishes to manage. Each view has an alert state that represents the highest alert state of all managed objects and sub-views of said view. Clicking on the sub-view icon will drill-down and bring up the sub-view display allowing the user to navigate directly to the managed object responsible for the alert state. In this setup, the top level view displays all the necessary information for the user to monitor the alert state of all managed objects within said view and any sub-views.

The user creates the views and places views within other views. These views are then sub-views of the view they were placed under. A view can have any number of sub-views and view nesting can occur to any level. Managed objects are thus arranged in a hierarchy created by the user. Sub-views are displayed within a view in the same manner as a managed object and appear as a managed object. Each view has an icon with a view image displayed over an alert image representing the highest level alert raised for all objects within the represented view and its sub-views. Selecting a sub-view icon within a view fills the alert details pane with the union of alerts for all managed objects of the sub-view and its sub-views.

A view that is not a sub-view of another is a top level view. A top level view contains all the necessary information for monitoring the alert state of all managed objects within said view and any sub-views. Generally, there is meant to be one top level view that contains all other views either directly or indirectly so that users may monitor all managed objects within their configuration by watching the top level view.

Double clicking a sub-view icon will bring up the view represented by the icon. Thus, users can navigate directly to the managed object responsible for the alert state of the view. Navigating in the opposite direction is accomplished by clicking the Up or Back arrows, and direct navigation is accomplished by using the navigation tree.

Figure 2:
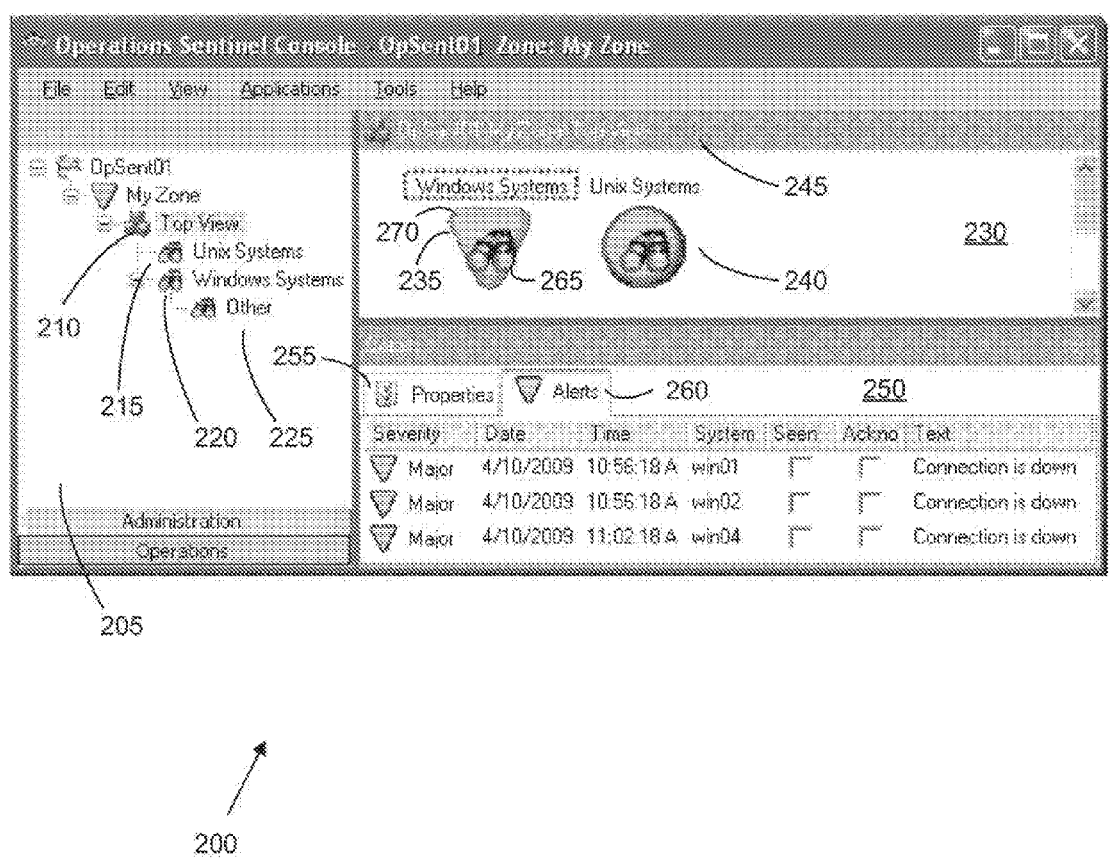
FIG. 2 is a screen shot of a user display window of a system for managing classes, according to one possible example embodiment of the present disclosure.

In one example embodiment, FIG. 2 illustrates a window 200 for managing objects. Window 200 is a top-level display having a navigation pane 205 to the left, illustrating the hierarchy of views and sub-views. The "Top View" 210 is a top-level view having two sub-views in this example, "Unix Systems" 215 and "Windows Systems" 220. In FIG. 2, you can see the hierarchical tree of the managed objects, created by the user. The Top View 210 has a collapse/expand signal next to it, as is known in the art, shown as expanded with sub-views Unix Systems 215 and Windows Systems 220 beneath it. The tree further includes "Other 225" as a sub-view, or sub-level of Windows Systems 220. The tree could be expanded further to include any number of sub-views or any level of nesting.

As illustrated in FIG. 2, the Top View 210 is grayed indicating that it is currently selected. As such, a display pane 230 shows a Windows Systems 235 icon and a Unix Systems 240 icon. In addition, the display pane 230 provides a description of the level at which the user is at in a description field 245. The window 200 also includes a detail pane 250 that illustrates more detailed information. In the display pane 230, as illustrated by the highlighting around the Windows System 235 icon, the Windows System 235 is currently selected. Thus, the details that show up in the detail pane 250 are details related to the Windows Systems 235. Alternatively, the Unix Systems 240 icon could be selected, and the details in the detail pane 250 would be for the Unix Systems 240.

Preferably, the detail pane 250 includes a Properties tab 255 and an Alert tab 260. The Properties tab 255, if selected, would show the properties of the object. As illustrated in FIG. 2, the Alert tab 260 is selected, and the detail pane 250 is listing the alerts for the Windows Systems 235. Alert conditions are raised when an alert event is received by the operations system. There are many sources for alerts, ranging from conditions that are automatically detected by the operations system to conditions raised by the user. The receipt of an alert event causes the Alert tab 260 to be populated.

Figure 3:
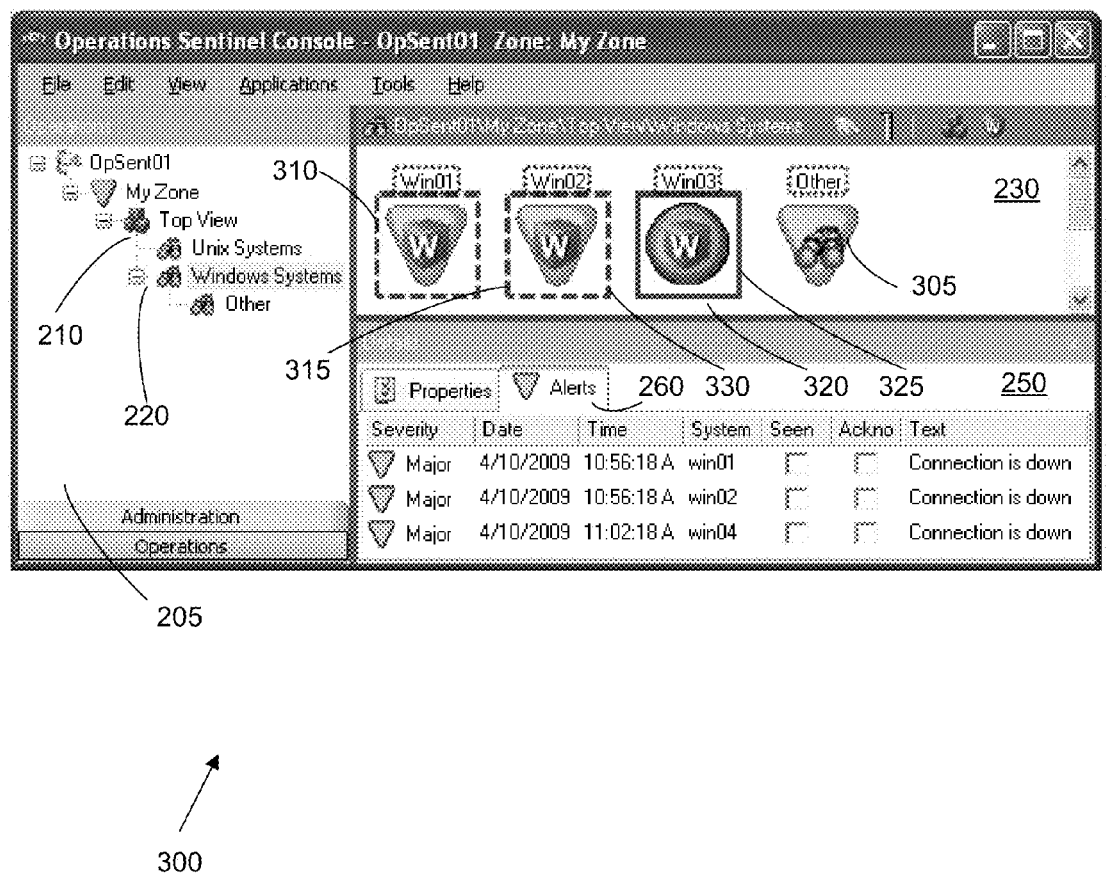
FIG. 3 is a screen shot of a user display window for managing classes, according to one possible example embodiment of the present disclosure.

Referring now to FIG. 3, a window 300 is illustrated. In this window 300, the Windows Systems 220 is selected rather than the Top View 210. As such, the display pane 230 shows the sub-view Other 305 under the Windows Systems 220. In addition, the three-managed objects of the Windows Systems 220 are shown. These managed objects include Win01 310, Win02 315, and Win03 320.

The detail pane 250 is displaying the alerts for the Windows Systems 220. As shown, there is an alert for Win01 310 that shows the alert is a major alert and that the connection is down. Also, there is an alert for Win02 315 that shows the alert as a major alert and that the connection is down. Referring back to FIG. 2, the detail pane 250 is displaying the same alerts for the Windows Systems 220. Thus, a user is able to monitor all managed objects within their configuration by mainly watching the Top View 210.

The iconic representation of a managed object in a topology diagram is constructed by overlaying one icon on top of another. Each icon may independently change visually as a result of user-defined events, e.g. change shape and/or color. This allows the user to display state information for the managed object simultaneously from two independent sources. This scheme is completely open-ended. Each piece of state information may be treated as completely separate from the other or the two may be combined to represent more complex state information for the object.

In FIG. 2, the Windows Systems 235 icon is illustrated. The icon illustrated includes a first icon 265, or view image, and a second icon 270, or alert image. The first icon 265 illustrates or gives information about what is contained within the Windows Systems 235. The first icon shows binoculars indicating that the Windows Systems 235 is a view. The second icon 270 indicates a state level. In FIG. 2, the state level is indicated by a triangle icon 270, indicating a major alert. The first icon 265 is laid over the second icon 270. In this fashion, the Windows Systems 235 icon illustrates both information about what it is (i.e. a view) and its current state (i.e. major alert). The Unix Systems 240 icon is also illustrated. The alert state of the Unix Systems 240 is shown as a circle, indicating no alerts are present.

The alert state could be further identified by color. For example, the second icon 270 could be yellow, indicating a major alert while the Unix Systems 240 icon is green indicating no alerts. Red could be used to indicate a critical alert.

Referring to FIG. 3, the Win01 310 icon is illustrated as having a "W" icon over laid on a triangle icon. The "W" icon indicates that this is a Windows managed object. The triangle icon again indicates there is a major alert for this managed object.

Figure 4:
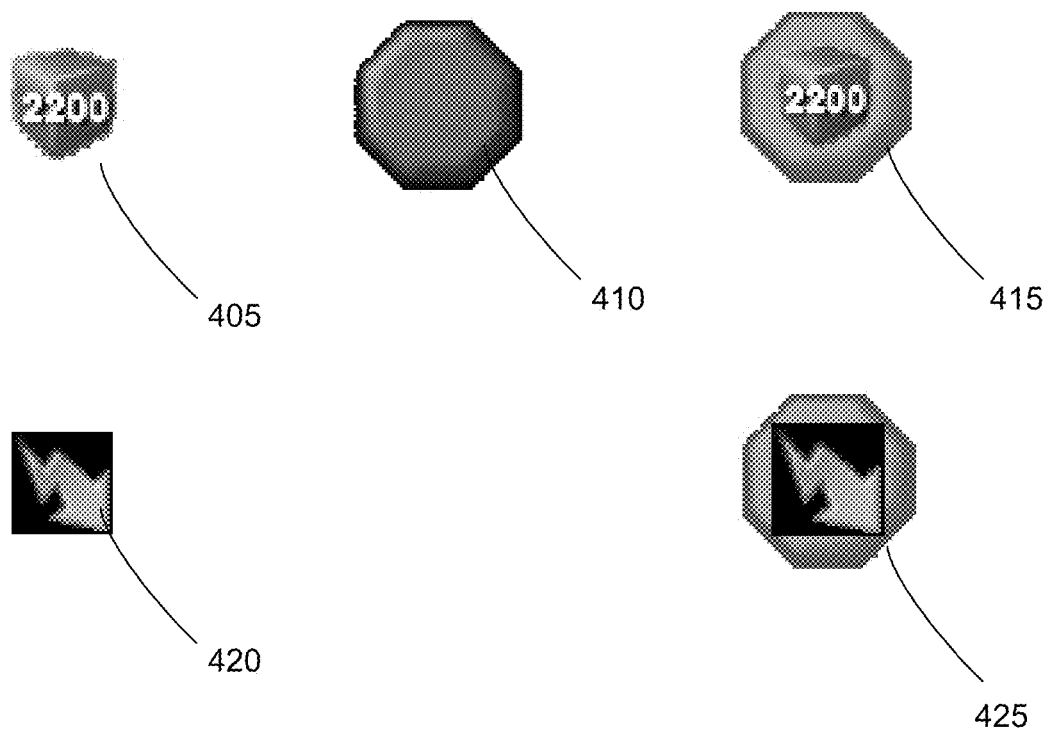
FIG. 4 illustrates possible icons, according to one possible example embodiment of the present disclosure.

Referring to FIG. 4, FIG. 4 illustrates examples of other types of icons. A first icon 405 might represent an OS 2200 System, while a second icon 410 represents a critical alert. The third icon 415 illustrates the result when the first icon 405 is over laid over the second icon 410 such that a single icon 415 visually represents tow different pieces of information.

The user could also define their own icons such as the fourth icon 420. The fifth icon 425 illustrates the result when the fourth icon 420 is laid over the second icon 410. The receipt of an alert condition will cause the behind icon, for example the second icon 410, to change to reflect the current state. In the examples given, this could be no alert (i.e. circle icon and/or green color), major alert (i.e. triangle and/or yellow color), and critical alert (i.e. octagon and/or red color). Of course, any number of suitable icons and/or colors could be used.

The "type" icon, i.e. the first icon 405, can also be changed by the receipt of an event report by the operations system. There are no automatic conditions that cause the "type" icon to change. The user must supply an event that specifies a change in the "type" icon. How this event is raised is completely separate from the alert events previously described. However, the user has control over both types of events and is able to coordinate them.

The user of superimposed icons and/or colors to indicate alerts for particular objects is advantageous. It allows the user to glance at a single iconic representation of a managed object to obtain all immediate state information for that object. It also extends the multiple state capability to all managed objects. Referring back to FIG. 3, a third indicator can be used to indicate the status of a managed object. This third indicator could represent the network connection state between a managed object and a network. The Win03 320 has a third indicator 325 illustrated as a solid line drawn around the other icons. In this example, the third indicator 325, represented by a solid line around the object, indicates an active connection to the network. The Win02 315 also has a third indicator 330 illustrated as a dashed line drawn around the other icons. In this example, the third indicator 330, represented by a dashed line around the object, indicates a disconnected condition or that the connection state is unknown. No line around the system or component could indicate that it is unmonitored or not connected to the network.

Color can also be used to indicate the network connection. Color could be used in the icon itself to indicate a connection state or the lines drawn around the icons could be colored to further indicate the connection state. For example, green might indicate that the object or system is connected, and red might indicate that the object is not connected.

The user of a third indicator is advantageous because the network connection state can be associated directly with the iconic representation of a managed object, removing the need for an iconic representation of the operations system as a representation of the network. Since the network is not otherwise represented in the topology diagram, this simplifies the topology diagram and the display for the user. The user of both lines and color redundantly represents a network connection state with two distinct visual clues.

In FIG. 2, the user is seeing a visual display of the user's entire managed system through the top view 210. In the display pane 230 shows the two systems included, the Windows System 235, and the Unix System 240. The user also sees the worst-case state of the Windows System 235 and the Unix System 240. The Unix System 240 has no alerts present in any of its managed objects and thus has an alert image of a circle icon behind its type icon. The alert image can also be green to further indicate that the Unix System 240 has not alerts.

Because the alerts flow up the hierarchy, the Windows System 235 is displaying the worst-case alert status of the managed objects within it. In this case, the worst-case alert state is a major alert, indicated by a triangle icon behind its type icon. The user can drill down further to pinpoint where the major alert is by double-clicking the Windows System 235 icon. When the user does this, FIG. 3 appears. The user quickly sees that Win01 310 and Win02 315 have major alerts, while Win03 320 has no alerts. The user can also see that Win01 310 and Win02 315 have down connections, which in this case is also the reason for the major alert. This is not always true.

In one application example, assume the user fixes the connection for Win01 310. The information displayed in the display pane 230 would update to reflect a green circle (assuming there are no other alerts for Win01 310) behind the type icon, and the dashed line would change to a solid line to indicate that Win01 310 is connected. The user can then go up one level to FIG. 2, but clicking top view in the navigation pane 205 or by hitting a "back" button. In this application example, the display in FIG. 2 would not change. This is because Win02 315 still has a major alert and because the Windows System 235 reflects the worst case below it, it would still reflect a major alert.

In this setup, the top level view displays all the necessary information for the user to monitor the alert state of all managed objects within said view and any subviews.

Figure 5:
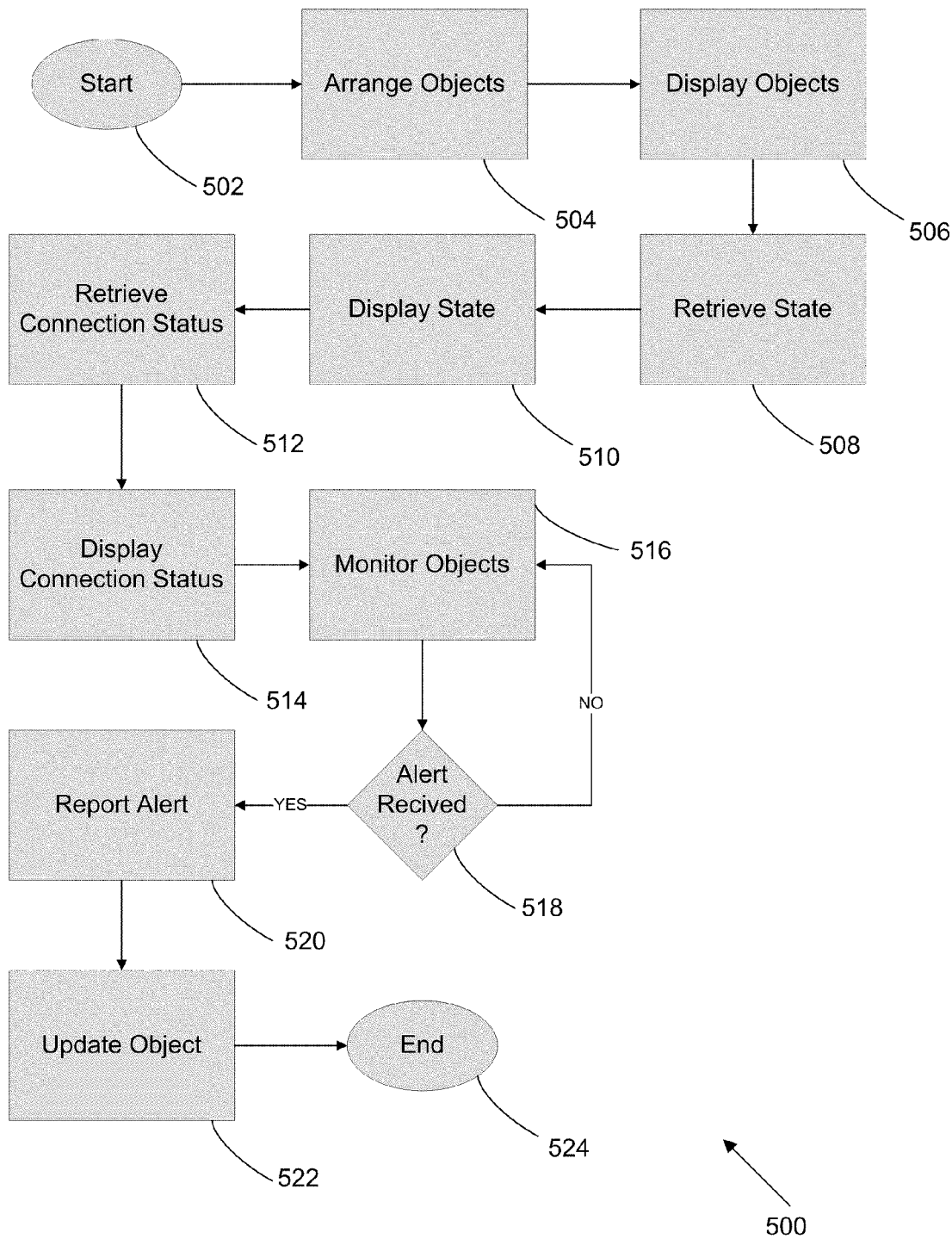
FIG. 5 is an operational flow diagram of a system for managing classes, according to one possible example embodiment of the present disclosure.

Referring to FIG. 5, FIG. 5 is an operational flow diagram illustrating a method 500 of monitoring objects. Operational flow begins at a start point 502. An arrange operation, or module, 504 arranges managed objects according to input from the user. Preferably, the managed objects are arranged in a hierarchy from top-view to lower nested views to managed objects. A first display operation 506 displays the objects for the user. For example, the display operation 506 might display the objects in a window such as window 200 of FIG. 2.

A first retrieve operation 508 retrieves information from the operational system about the state of the managed objects arranged by the arrange operation 504. The state might be that a particular managed object has a major alert. A second display operation 510 displays the states of the managed objects arranged by the arrange operation 504. For example, a particular managed object might have a major alert associated with. The second display operation 510 displays that that particular managed object has a major alert. For example, the second display operation 510 might display the major alert as illustrated in window 200 of FIG. 2 and as discussed above.

Referring to FIG. 3, it is noted that the second display operation 510 might display an icon indicating the state of Win01 310 as a triangle icon and Win03 320 as a circle icon behind the object icons. In other words, the second display operation 510 might superimpose the object icon onto a state icon to visually indicate to a user the state of the object. The triangle would indicate to a user that major alert was present for Win01 310, while the circle would indicate to the user that no alerts were present for Win03 320. In addition, as discussed above, colors could be used as well as shapes. Referring to FIGS. 2 and 3, it is also noted that not only would the second display operation 510 cause the particular displays for Win01 310 and Win03 320, but the second display operation 510 would also cause the Windows Systems 235 icon to have a triangle shape to indicate that Win01 310 has a major alert. In this fashion, the operational system is indicating to a user at all view levels any relevant state information of all the levels below the current level. The state information flows up the hierarchy such that a user can readily see and diagnose the alert. As the alert indicator progresses up the hierarchy, the worst-case alert state is displayed such that the user can visually see the worse-case alert. As that worst case alert is cleared, then the displays would be updated such that the next worst case alert can be displayed.

A second retrieve operation 512 retrieves a connection status for the managed objects. The connected status of a particular managed object might be that it is disconnected from the system. A third display operation 514 displays the connected status of the objects. For example, the third display operation 514 might display the connection status as illustrated in window 300 of FIG. 3 and as discussed above.

Referring to FIG. 3, it is noted that the third display operation 514 might display the connection status of Win01 310 as a dashed line and Win03 320 as a solid line. The dashed line would indicate to a user that Win01 310 was disconnected, while the solid line would indicate to the user that Win03 320 was connected. In addition, as discussed above, colors could be used as well as line shapes. Referring to FIGS. 2 and 3, it is also noted that not only would the third display operation 514 cause the particular displays for Win01 310 and Win03 320, but the third display operation 514 might also cause the Windows Systems 235 icon to have dashed line to indicate that Win01 310 is disconnected. In this fashion, the operational system can indicate to a user at all view levels any relevant information of all the levels below the current level. The information flows up the hierarchy such that a user can readily see and diagnose the information. As the alert indicator progresses up the hierarchy, the worst-case alert state is displayed such that the user can visually see the worse-case alert. As that worst case alert is cleared, then the displays would be updated such that the next worst case alert can be displayed.

A monitor operation 516 monitors all of the managed objects in the operational system for an alert. A determine operation 518 determines if an alert has been received. If the determine operation 518 determines that an alert has not been received, then operational flow branches "NO" back to the monitor operation 516. If the determine operation 518 determines that an alert has been received, operational flow branches "YES" to a report operation 520. The report operation 520 reports the alert. For example, the report operation 520 might report the alerts as shown in FIG. 2 and discussed above. An update operation 522 updates the any managed object for whom the alert is affected. In other words, the update operation 522 would cause the visual representation of any managed object or view to change to reflect is current condition.

Operational flow ends at end point 524. It is noted thought that for continuous monitoring, operational flow would not end at end point 524, but would continuously loop back to the monitor operation 516.

In another aspect, the present disclosure relates to the capability for users to manage systems and components of computing systems such as disks, tapes, users, and processes by managing classes within an operational system. The present disclosure generalizes an alerting mechanism for all objects managed by an operational system by providing an identification syntax for objects in events.

Alerts can be issued for objects and classes. An example alert might be that a disk drive, an object of the managed system, is close to full. An alert can be sent via an alert event report that requires the recipient of the report to be identified in Class and Instance properties of the event report. Possible values for the Class include the names of various system classes identifying OS 220, MCP, UNIX, Windows, and other system classes. Instance is the name of a single managed object associated with an actual system on the network.

Prior systems did not allow objects owned by another object to be the recipient of an alert. In other words, only the top level object could be the recipient of an alert. The present disclosure is advantageous in that it allows any object to be identified by extending the syntax for Class and Instance for a hierarchy of classes and instances to allow specific and completely unambiguous identification of any object managed by the system regardless of ownership. For example, a disk drive can be connected to an OS 2200 system. Using standard predefined classes, the disk drive is modeled as an object of class type "OS 2200 Disk" and is connected to a system modeled as an object of type "OS 2200 System". Because the disk is "owned" by the system in a parent child relationship, the complete class specification is a hierarchy of classes (separated by space-period-space delimiter):

OS 2200 System. OS 2200 Disk

The instance specification is likewise a hierarchy of actual object names, including the system and disk. If the disk is called "disk1" and the system is called "system1", then the specification is:

system1. disk1

Because there is no limit on how objects are connected or owned by one another, the class and instance identification syntax is infinitely extendable to match any relationship between any number of objects. For example, the class syntax takes the generalized form:

class1. class2. class3 . . . classN

The instance identification syntax is likewise infinitely extendable to match any conceivable relationship between any number of objects:

obj1. obj2. obj3. objN

Thus, the complete parent/child relationship for an object can be defined and an alert can be sent to any object managed by the system. Since an open-ended capability is provided to create objects owned by other objects, with ownership levels nested to any degree, this dramatically extends the alerting capabilities of the product. Alerts can be targeted more precisely at the source of a problem, rather than requiring users to start at the top level and drill down to the location of the problem. This speeds up the isolation of problems and the ability to quickly take corrective action to resolve problems.

Figure 6:
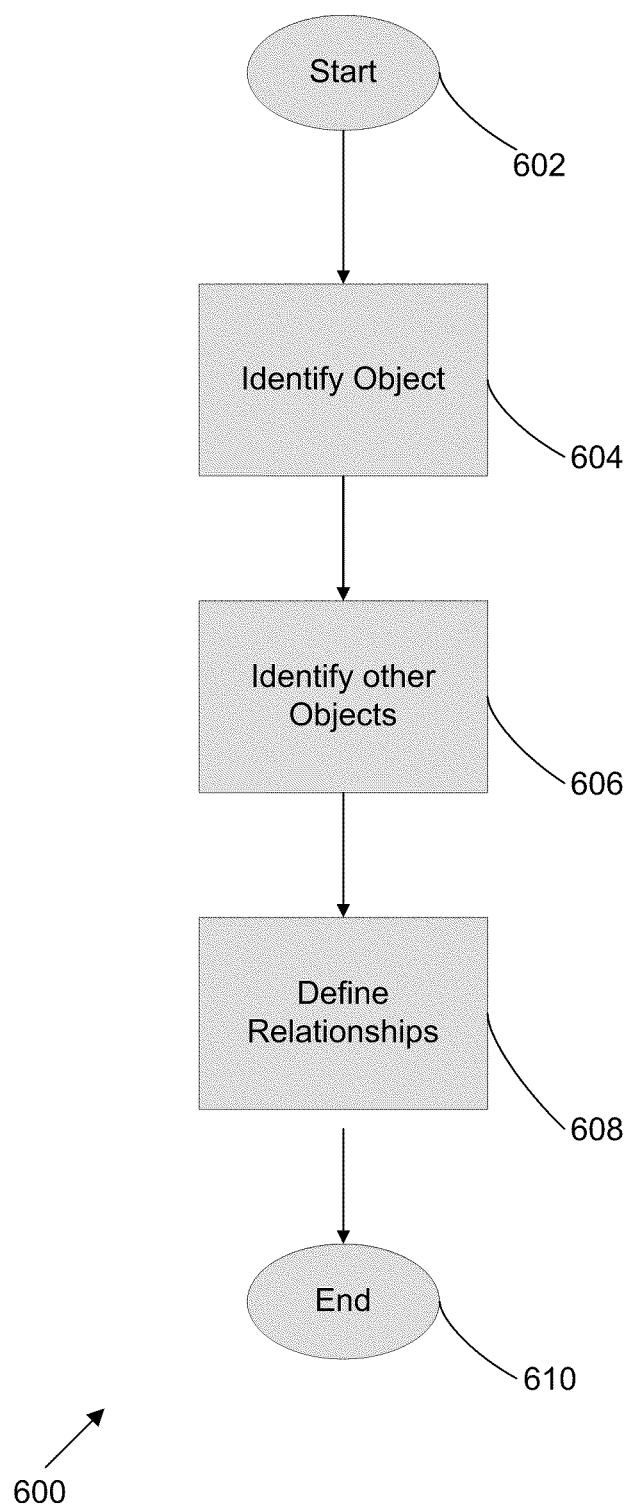
FIG. 6 is an operational flow diagram of a system for managing classes, according to one possible example embodiment of the present disclosure.

Referring to FIG. 6, FIG. 6 is an operational flow diagram illustrating a method 600 of identifying a unique object. Operational flow begins at a start point 602. A first identify operation 604, or module, identifies the unique object. Preferably, the unique object is identified by its class and instance. A define operation 606, defines the objects parent relationship. In other words, the unique object is in a parent/child hierarchy. The define operation 606 defines that hierarchy. A second identify operation 608 identifies the other objects within the hierarchy. Preferably, the other objects are identified by their class and instance. Operational flow ends at end point 610.

As an example, a disk drive is connected to an OS 2200 system. The first identify operation 604 identifies the disk drive by its class and instance. The identifier is:

OS 2200 Disk: Disk1

The parent of the unique object is the OS 2200 system. The second identify operation 606 identified the system by its class and instance. The identifier for the this is:

OS 2200 System: System 1

The define operation 608 defines the relationship between the two objects. For this example, the complete syntax readable by a computing system would be:

OS 220 System: System 1. OS 2200 Disk: Disk1

From this syntax, it is apparent that Disk1 is a child of System1. Those of skill in the art will recognize that this is a very limited example, as other system or components would also be necessary. For example, the parent to the OS 2200 System would be a server that would also be identified. Any level of nesting can be identified in this fashion using the above syntax.

It is recognized that the above systems, and methods operate using computer hardware and software in any of a variety of configurations. Such configurations can include computing devices, which generally include a processing device, one or more computer readable media, and a communication device. Other embodiments of a computing device are possible as well. For example, a computing device can include a user interface, an operating system, and one or more software applications. Several example computing devices include a personal computer (PC), a laptop computer, or a personal digital assistant (PDA). A computing device can also include one or more servers, one or more mass storage databases, and/or other resources.

A processing device is a device that processes a set of instructions. Several examples of a processing device include a microprocessor, a central processing unit, a microcontroller, a field programmable gate array, and others. Further, processing devices may be of any general variety such as reduced instruction set computing devices, complex instruction set computing devices, or specially designed processing devices such as an application-specific integrated circuit device.

Computer readable media includes volatile memory and non-volatile memory and can be implemented in any method or technology for the storage of information such as computer readable instructions, data structures, program modules, or other data. In certain embodiments, computer readable media is integrated as part of the processing device. In other embodiments, computer readable media is separate from or in addition to that of the processing device. Further, in general, computer readable media can be removable or non-removable. Several examples of computer readable media include, RAM, ROM, EEPROM and other flash memory technologies, CD-ROM, digital versatile disks (DVD) or other optical storage, magnetic cassettes, magnetic tape, magnetic disk storage or other magnetic storage devices, or any other medium that can be used to store desired information and that can be accessed by a computing device. In other embodiments, computer readable media can be configured as a mass storage database that can be used to store a structured collection of data accessible by a computing device.

A communications device establishes a data connection that allows a computing device to communicate with one or more other computing devices via any number of standard or specialized communication interfaces such as, for example, a universal serial bus (USB), 802.11a/b/g network, radio frequency, infrared, serial, or any other data connection. In general, the communication between one or more computing devices configured with one or more communication devices is accomplished via a network such as any of a number of wireless or hardwired WAN, LAN, SAN, Internet, or other packet-based or port-based communication networks.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of identifying a unique object nested within a hierarchy of objects in a computing system, the method, comprising:

identifying the unique object by its class and instance in a syntax readable by the computing system;

identifying at least one parent object by its class and instance in the syntax, further including identifying all parent objects in the hierarchy of objects; and defining a relationship between the unique object and the parent object in the syntax, in Which defining a relationship includes defining all relationships between all parent objects in the hierarchy of objects and the unique object, wherein an alert can be issued for the unique object regardless of how nested the unique object is within the hierarchy of objects;

issuing an alert for the unique object, wherein all parent objects sharing a relationship with the unique object receive the alert;

displaying, on a same view in a first pane, the hierarchy of objects and the alert for the unique object;

displaying, on the same view as the hierarchy of objects but separately in a second pane, a display pane which displays the top level managed objects and any alert within the hierarchy of those objects; and wherein displaying the alert comprises overlaying a first shape specifying a type of system that corresponds to the unique object, a second shape specifying an alert state for the unique object based, at least in part, on the issued alert, and a third shape specifying a network connection state between the unique object and a network to display a single shape that provides the information specified by the first, second, and third shapes by displaying at least a portion of each of the first, second, and third shapes within the single shape.

2. A method according to claim 1, further comprising:
identifying a second parent object by its class and instance in the syntax; and
defining a relationship between the second parent object and the first parent object in the syntax.

3. A method according to claim 1, wherein identifying a unique object by its class and instance in a syntax includes separating the class and instance by a colon in the syntax.

4. A method according to claim 1, wherein defining a relationship between the unique object and the parent object in the syntax includes separating the parent object and the unique object by a period in the syntax.

5. A method according to claim 1, further comprising:
issuing at least one other alert for at least one other unique object; and
displaying at least one other alert,
wherein displaying at least one other alert includes using a shape or color to display the at least one other alert, and
wherein the alert, at least one other alert, and the hierarchy of objects are displayed on the same view.

6. The method of claim 1, further comprising: displaying, on the same view as the hierarchy of objects but separately in a third pane, a details pane which displays a connection status of at least one object.

7. A programmable computing system for identifying a unique object nested within a hierarchy of objects in the computing system, the programmable computing system comprising:
a first identify module that identifies the unique object by its class and instance in a syntax readable by the computing system;
a second identify module that identifies at least one parent object by its class and instance in the syntax, and further, identifies all parent objects in the hierarchy of objects; and
a define module that defines a relationship between the unique object and the parent object in the syntax, in which defining a relationship includes defining all relationships between all parent objects in the hierarchy of objects and the unique object;
wherein an alert can be issued for the unique object regardless of how nested the unique object is within the hierarchy of objects,
wherein all parent objects sharing a relationship with the unique object receive the alert,
wherein the alert and the hierarchy of objects are displayed on the same view;
wherein, on the same view as the hierarchy of objects but separately in a second pane, a display pane displays the top level managed objects and any alert within the hierarchy of those objects; and
wherein the programmable computing system is configured to display the alert by overlaying a first shape specifying a type of system that corresponds to the unique object, a second shape specifying an alert state for the unique object based, at least in part, on the issued alert, and a third shape specifying a network connection state between the unique object and a network to display a single shape that provides the information specified by the first, second, and third shapes by displaying at least a portion of each of the first, second, and third shapes within the single shape.

8. The programmable computing system according to claim 7, further comprising:
identifying a second parent object by its class and instance in the syntax; and
defining a relationship between the second parent object and the first. parent object in the syntax.

9. The programmable computing system according to claim 7, wherein identifying a unique object by its class and instance in a syntax includes separating the class and instance by a colon in the syntax.

10. The programmable computing system according to claim 7, wherein defining a relationship between the unique object and the parent object in the syntax includes separating the parent object and the unique object by a period in the syntax.

11. The programmable computing system according to claim 7, wherein displaying the alert includes using a shape or color to display the alert to the user graphically.

12. The programmable computing system comprising of claim 7, wherein, on the same view as the hierarchy of objects but separately in a third pane, a details pane displays a connection status of at least one object.

* * * * *